US012194976B1

(12) United States Patent
Trepanier

(10) Patent No.: US 12,194,976 B1
(45) Date of Patent: Jan. 14, 2025

(54) SAFETY PARKING BRAKE SYSTEM FOR CAMPERS AND ALL TOW TRAILERS

(71) Applicant: Robert F Trepanier, Plymouth, MA (US)

(72) Inventor: Robert F Trepanier, Plymouth, MA (US)

( * ) Notice: Subject to any disclaimer, the term of this patent is extended or adjusted under 35 U.S.C. 154(b) by 0 days.

(21) Appl. No.: 18/465,066

(22) Filed: Sep. 11, 2023

(51) Int. Cl.
*B60T 7/10* (2006.01)
*F16M 13/02* (2006.01)

(52) U.S. Cl.
CPC .............. *B60T 7/102* (2013.01); *F16M 13/02* (2013.01)

(58) Field of Classification Search
CPC ........... B60T 7/102; B60T 7/20; F16M 13/02; G05G 1/54; B60K 20/04; B60K 26/00; F16H 59/0278
See application file for complete search history.

(56) References Cited

U.S. PATENT DOCUMENTS

| | | | | |
|---|---|---|---|---|
| 2,604,192 | A * | 7/1952 | Taylor | B60T 1/14 188/5 |
| 3,570,633 | A * | 3/1971 | Garnett | B60T 11/107 280/428 |
| 3,948,566 | A * | 4/1976 | Salam | B60T 13/04 303/7 |
| 4,856,363 | A * | 8/1989 | LaRocca | B60T 7/104 74/523 |
| 6,202,504 | B1 * | 3/2001 | Burkle | G05G 1/54 74/544 |
| 9,174,614 | B2 * | 11/2015 | Mercure | B60D 1/58 |
| 9,598,060 | B2 * | 3/2017 | Mercure | F02D 19/10 |
| 2007/0050999 | A1 * | 3/2007 | Milner | B65G 69/2882 33/286 |
| 2007/0096431 | A1 * | 5/2007 | Mochizuki | B60D 1/26 280/515 |
| 2013/0026735 | A1 * | 1/2013 | Mercure | B60T 7/20 280/446.1 |
| 2014/0015226 | A1 * | 1/2014 | MacKarvich | B60D 1/065 280/509 |
| 2014/0339791 | A1 * | 11/2014 | McCall | B60D 1/485 280/491.5 |
| 2016/0280112 | A1 * | 9/2016 | Jarvis | B60P 1/04 |
| 2018/0188766 | A1 * | 7/2018 | Fryer | B60K 26/00 |

FOREIGN PATENT DOCUMENTS

| | | | |
|---|---|---|---|
| CN | 201264598 Y | * | 7/2009 |
| CN | 110466291 A | * | 11/2019 |

OTHER PUBLICATIONS

Machine translation of CN 201264598Y, Zhou et al., Jul. 1, 2009 (Year: 2009).*
Translation of CN 110466291A, Li et al., Nov. 19, 2019 (Year: 2019).*

* cited by examiner

*Primary Examiner* — Vinh Luong
(74) *Attorney, Agent, or Firm* — Robert Francis Trepanier

(57) ABSTRACT

With the safety parking braking system, the security of a parking brake is required to be engaged before detaching the trailer. When the safety parking brake lever is lifted, the brakes are applied, the Index plunger pin locks the lever in place and the lock out bar rises thus allowing the trailer to safely be detached from the vehicle without having to remember the tire chock blocks. With little modifications, the safety parking braking system can be retrofitted to any trailer, new or old.

3 Claims, 5 Drawing Sheets

SAFETY PARKING BRAKE SYSTEM FOR CAMPERS AND ALL TOW TRAILERS

FIELD OF THE INVENTION

The present invention relates to a safety parking braking system for detached campers, boats and/or utility trailers, particularly to a manual safety parking brake lever with a lock out bar to prevent detaching a trailer without first engaging the safety parking brake lever.

BACKGROUND

In being an outdoorsman and an avid camper, it's not always a stress free parking experience. Most times, it's trying to squeeze a travel trailer into a wooded area, between trees, around a corner, remembering to leave enough room for the bump outs and picnic table, while watching for other children and other campers. An occupied mind can leave even the most experienced person with an opportunity to forget the most important part of parking the camper, the tire chock blocks. Whether it be an attached travel trailer ready to leave, the tire chock blocks are at times forgotten, being driven over and crushed or even worse, not being placed when disconnecting the travel trailer from the vehicle, leaving it to dangerously roll into vehicles or completely away.

When leveling a camper there are times where the ground is so uneven that there are multiple leveling blocks placed under the tires that leave the tire chock blocks open to improperly secure the tires. There is also potential risk when the trailer is parked for long periods of time where environmental elements can change the ground around the tires, such as torrential rain, causing the ground to wash away or even worse, the tire chock blocks to wash away, leaving the trailer unsecured.

There are currently no safety requirements for detached travel trailers, boats or utility trailers; it relies solely on a person's memory to insert the tire chock blocks to prevent the trailer from rolling away. There is a need for a safety parking braking system to prevent a potential costly human error. Most times when parking a travel trailer, you should first, add the tire chock blocks behind and in front of the tires, then lower the trailer tongue jack (1), this is the pole that extends down to the ground that takes the weight off of the trailer tongue and in turn raises the Tongue to a neutral position. Next, lift the trailer coupler release latch (5), and pull the release latch pin (6), this releases the tension off of the ball so that the trailer will detach from the vehicle when the tongue jack is properly lowered. Continue to lower the tongue jack until the tongue clears the trailer hitch ball. You would then disconnect the wiring harness and the safety chains that connect the trailer to the vehicle, at this point there is nothing that prevents the travel trailer from rolling away except for the tire chock blocks, if they were placed correctly. Final step is to pull the vehicle away. With a safety parking braking system, the trailer is secured by the safety parking brake lever that is required to be engaged before you can even lift the trailer coupler release latch, it can not be forgotten.

SUMMARY OF THE INVENTION

The present invention comprises of a safety parking brake lever that is mounted to the trailer tongue frame with a mounting plate that is positioned between the trailer frame and the top portion of the trailer tongue jack. An added lock out bar is welded to the safety parking brake lever. 3

When the safety parking brake lever is pulled up it engages the two emergency brake wheel assemblies, exactly how an emergency brake works in your vehicle. The wheels are locked in place at the same time moving the lock out bar up and out of the way of the trailer couple release latch. This allows the coupler release latch to be lifted and the coupler release latch pin to be removed from the trailer coupler latch. When the safety parking brake lever is pulled up, it automatically engages the index plunger pin, a pin that is spring loaded and inserts behind the ratcheting mechanism in the lever and prevents the safety parking brake lever from being accidentally released.

With the safety parking braking system a trailer can not be disconnected without pulling the safety parking brake lever up, therefore eliminating a chance to forget to secure the trailer before disconnecting. The engaged safety brakes also help to stabilize a camper from rocking that tire chock blocks don't do, creating a much better camping experience.

DETAILED DESCRIPTION OF THE INVENTION

The below description is given by way of example, and without limitation. Given the above disclosure, one skilled in the art could devise variations that are within the scope and spirit of the invention disclosed herein and can be used alone, or in varying combinations with each other and are not to be limited to the specific combination described herein. The scope or claims are not to be limited by the illustrated embodiments or exact materials of the prototype.

Figure 1:
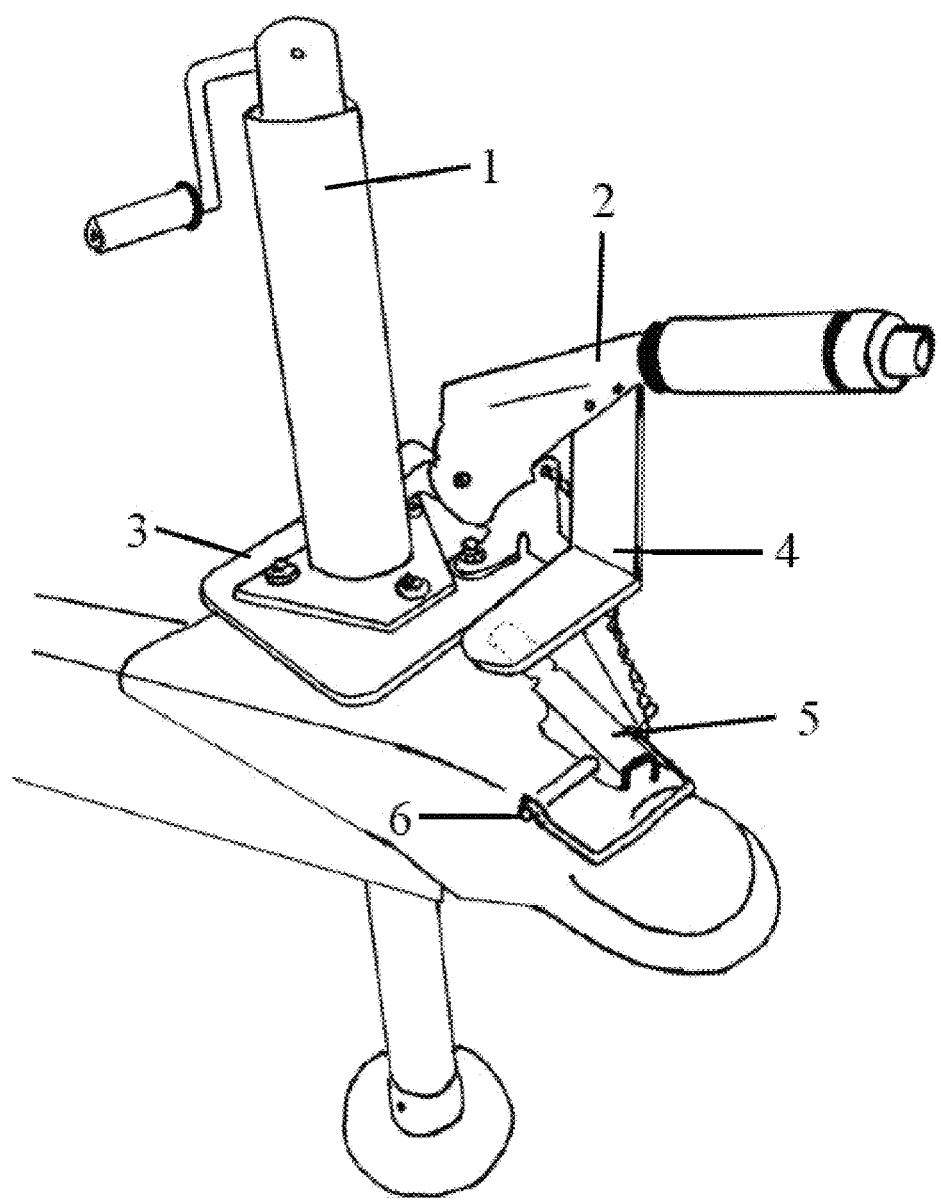
FIG. 1 is a view from the right, passenger side of trailer showing the trailer jack, a disengaged safety parking brake lever, mounting plate, the lock out bar, coupler release latch and the coupler release latch pin.

FIG. 1 is a view from the right, passenger side of trailer showing the trailer jack (1), a disengaged safety parking brake lever (2), mounting plate (3), the lock out bar (4), coupler release latch (5) and the coupler release latch pin (6).

Figure 2:
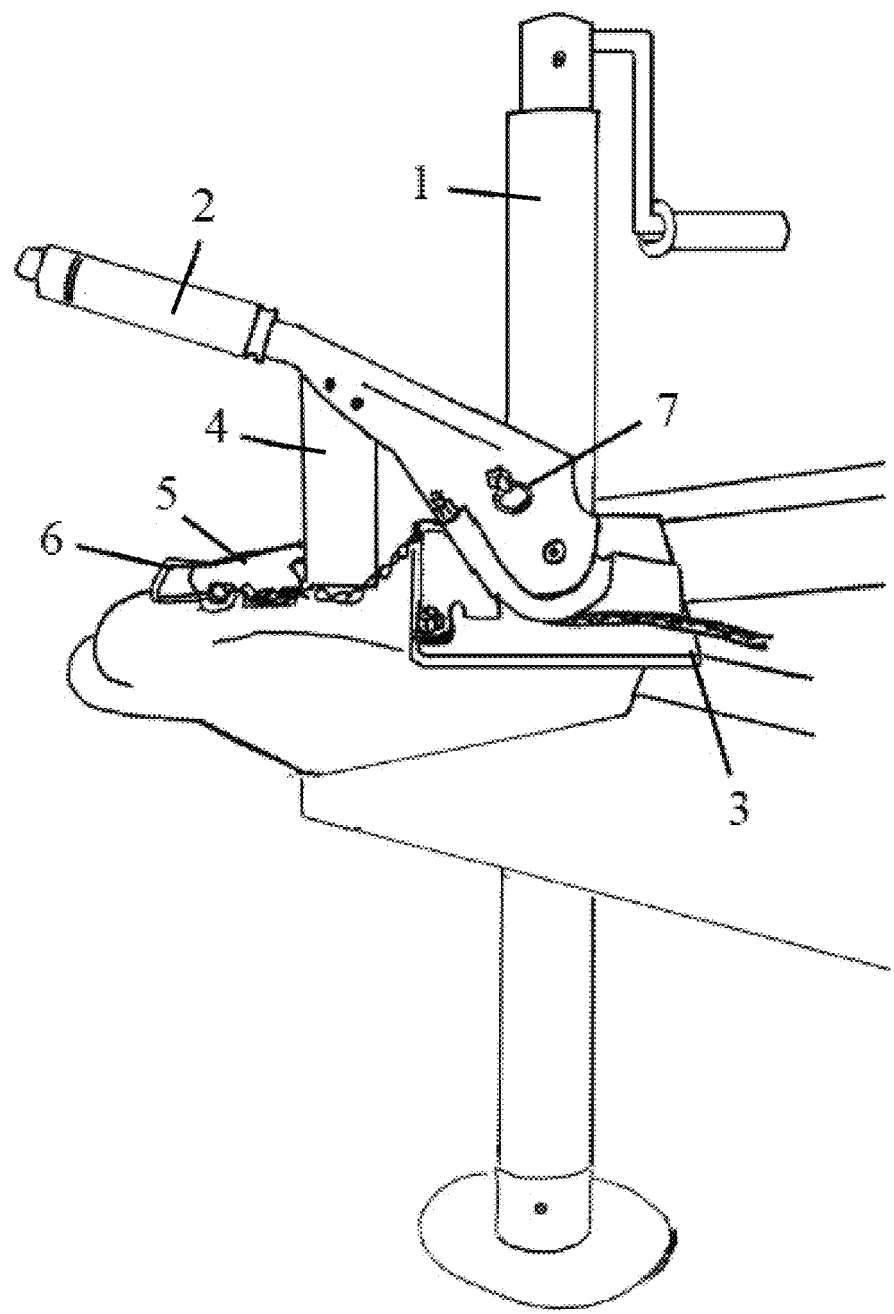
FIG. 2 is a view from the left, driver side of the trailer showing the trailer jack, safety parking brake lever that is NOT engaged, the mounting plate, lock out bar, a closed coupler release latch, coupler release latch pin and the index plunger pin.

FIG. 2 is a view from the left, driver side of the trailer showing the trailer jack (1), safety parking brake lever that is NOT engaged (2), the mounting plate (3), lock out bar (4), a closed coupler release latch (5), coupler release latch pin (6) and the index plunger pin (7).

Figure 3:
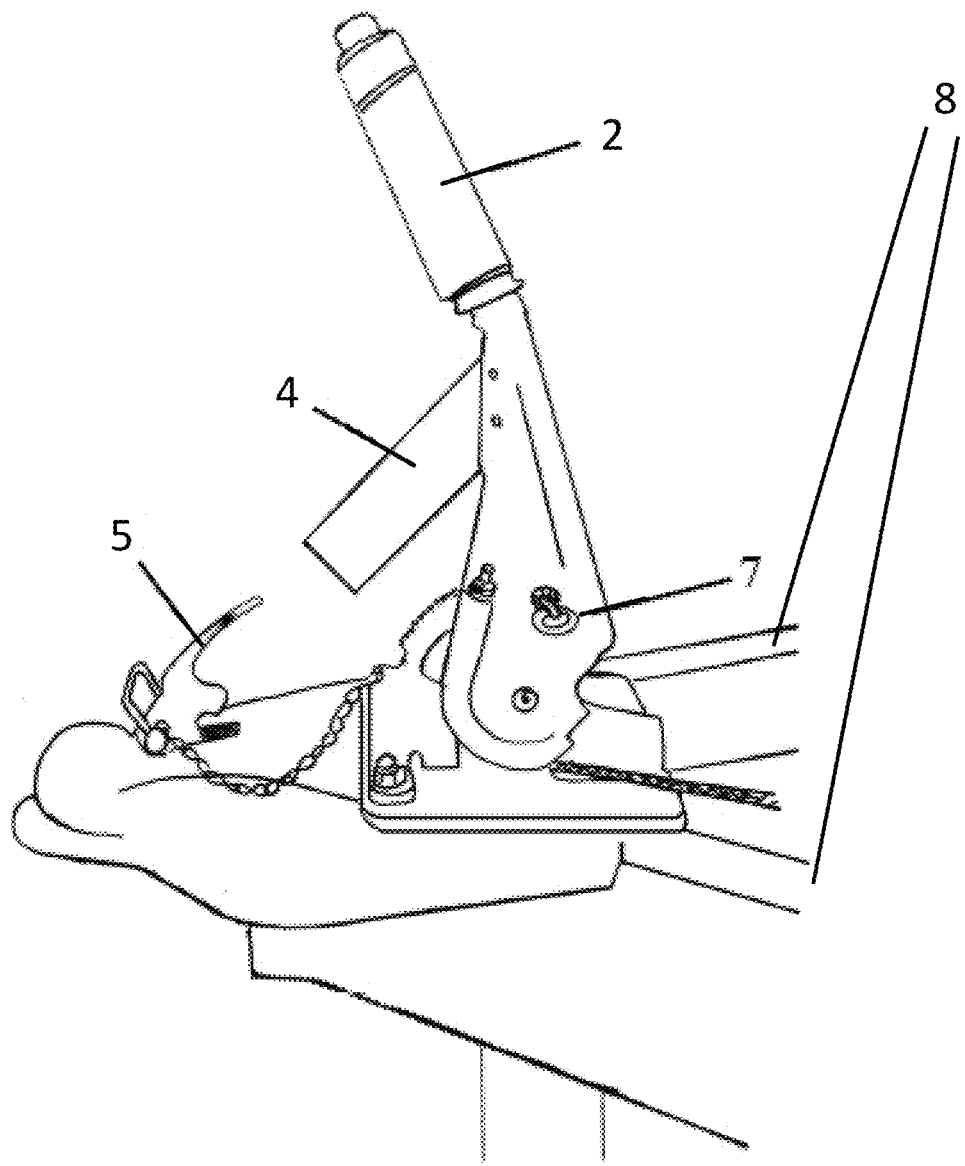
FIG. 3 is a view from the left, driver side of the trailer showing the index plunger pin, an engaged safety parking brake lever, lock out bar lifted, trailer frame top and an open coupler release latch.

FIG. 3 is a view from the left, driver side of the trailer showing the index plunger pin (7), an engaged safety parking brake lever (2), lock out bar lifted (4), trailer frame top (8) and an open coupler release latch (5).

Figure 4:
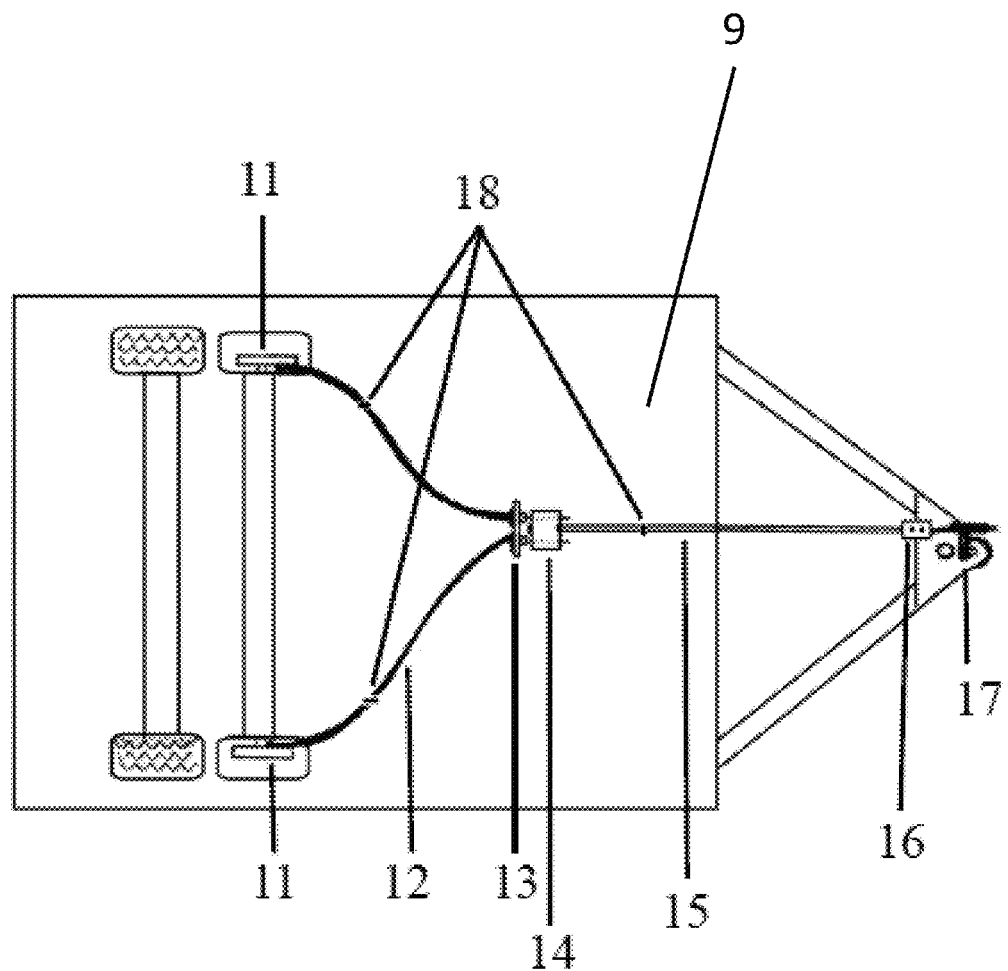
FIG. 4 is an underside view of the travel trailer showing electric wheel brake assembly equipped with an emergency brake, emergency brake cable lines, cable mounting plate, distribution block, 5/16" metal rod, clevis, cable eyelet, trailer bottom and mounting clips.

FIG. 4 is an underside view of the travel trailer showing electric wheel brake assembly equipped with an emergency brake (11), emergency brake cable lines (12), cable mounting plate (13), distribution block (14), 5/16" metal rod (15), clevis (16), cable eyelet (17), trailer bottom (9) and mounting clips (18).

Figure 5:
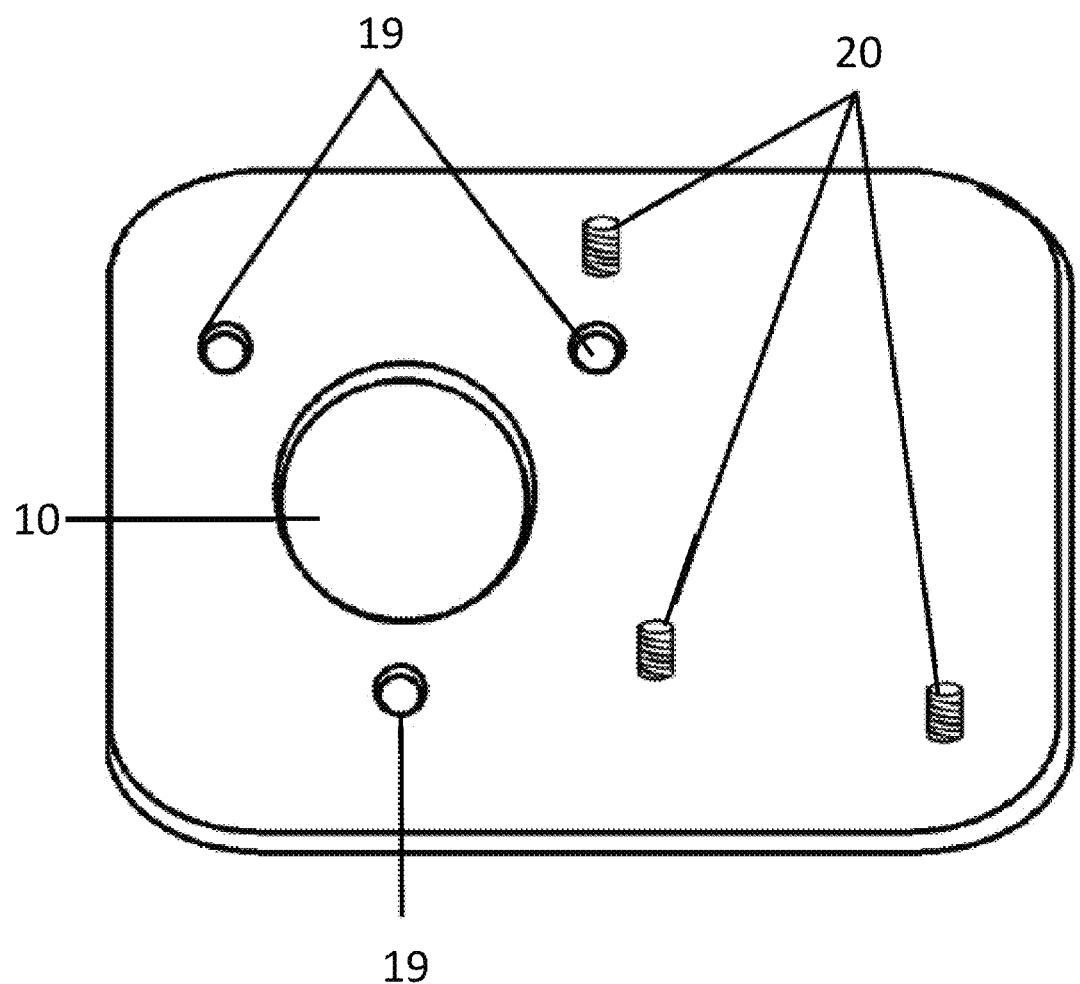
FIG. 5 is a down view of the mounting plate with cutout for the trailer tongue jack and with holes for screw placement and welded bolts for attaching the mounting plate to the frame.

FIG. 5 is a down view of the mounting plate (3) with cutout (10) for the trailer jack tongue and holes (19) for screw placement and welded bolts (20) for attaching the mounting plate to the frame.

The following items would be needed to make the invention functional: 1. Left and right electric wheel brake assembly kit equipped with an emergency brake. 2. A universal parking brake kit that includes: Two cables, one distribution block, adjustable clevises and required hardware. 3. 5/16" threaded steel rod, length determined by travel trailer. 4. Emergency brake hand lever. 5. 1/8" thick flat stock metal bent to 90 degree angle, desired length is based on trailer tongue and Emergency Hand Brake Lever used. 6. Mounting plate made of 1/4" steel plate that attaches under the trailer tongue jack on the trailer tongue frame by 3 bolts. 7. Locking index plunger pin welded in place on safety parking brake lever that prevents the safety parking brake lever from being accidentally released.

To make the invention functional you would have to replace the existing left and right electric wheel brake assemblies that come standard on the travel trailer with an electric wheel brake assembly kit equipped with an emergency brake. For utility trailers, there is no existing brake assembly, so you would just install the electric wheel brake assembly kit equipped with an emergency brake. For the prototype, Kwik-Load Model #77-10EP-22 RIGHT, #77-10EP-23 LEFT was used, other sizes and manufacturer brands are available and would be acceptable to use.

A universal parking brake kit, for the prototype AC Delco® Model #330-9371 parking brake kit was used, other manufacturer brands are available and could be used in its place; this gets attached to the emergency brake assembly per manufacturer's instructions.

The two emergency brake cables (12) that are supplied with the universal parking brake kit are attached to the cable mounting plate (13), that is then connected to the distribution block (14) that was supplied with the universal parking brake kit.

A 5/16" steel threaded rod (15), cut to desired trailer length or expanded with couplers, based on trailer length, is then connected on the other end of the distribution block (14). Two 30" threaded rods joined together with a coupling were used in the prototype. The 5/16" steel threaded rod is then connected to a clevis (16) that was supplied with the universal parking brake kit, then to the safety parking brake lever's cable eyelet (17). All this is secured to the trailer frame with the supplied clips (18) from the universal parking brake kit.

A hole is cut into the safety parking brake lever that fits the size of the locking plunger pin (7) that is then welded in the opening. For the prototype a M6 nickel plated indexing spring plunger with pull ring and stainless steel, threaded pin was used. When the safety parking brake lever (2) is engaged, the index plunger pin automatically springs into place preventing the safety parking brake lever from being lowered without pulling the ring back on the locking plunger pin.

Before installing the safety parking brake lever (2), to the trailer you will first need to remove the trailer tongue jack's bolts and slide the tongue jack (1) out of the opening. The emergency brake lever used for the prototype is an AC Deco® Model #42563907; other low profile levers and manufacturer brands are available and acceptable to use.

The safety parking brake lever is then attached to the trailer tongue jack and tongue jack, by using the mounting plate (3). The mounting plate can be mounted to the majority of trailers with no modifications to the mounting plate.

The mounting plate (3) is made from 1/4" steel plate with a 2 3/8" hole cut out for the trailer tongue jack, three 7/16" holes for the trailer tongue jack mounting bolts to pass through and be bolted between the top of the trailer frame and trailer tongue jack. Hole placements are based on the standard tongue jack used for most tow trailers and are then cut out. Three 5/16" Grade 8 bolt threads, 9/16" in height, are welded to the underside of the plate that mount the safety parking brake lever to the mounting plate. Then the mounting plate (3) is bolted to the tongue jack and Trailer Frame using the existing bolts of the trailer tongue, longer bolts may be required due to the thickness of the mounting plate. The safety parking brake lever may also be welded to the trailer tongue for a more permanent installation. The safety parking brake lever is mounted on the left side of the trailer tongue making it easily accessible to the driver of the vehicle.

Using the 1/8" flat stock metal, configure the size by placing the metal against safety parking brake lever while it is disengaged, at a location that would be above the release coupler latch, then create a 90 degree bend in the flat stock bar that creates the lock out bar (4) that prevents the release coupler latch from being lifted. For the prototype a 10"×1 1/2" flat stock metal was used with a 90 degree bend 2" up from bottom. Exact location and specific size will vary based on the trailer tongue and emergency brake lever used.

The 90 degree bent metal is then welded to the safety parking brake lever at the correct location for latch coverage as determined by the location of disengaged safety parking brake lever, lever type and the coupler release latch positioning. This creates a blocking point to the trailer coupler release latch (5) that prevents the operator from removing the coupler release latch pin (6) therefore keeping tension on the ball and preventing the trailer from being detached without the safety parking brake lever being engaged.

The last step is to adjust the emergency brake cable and safety parking brake lever for maximum grip on the electric wheel brake assemblies with emergency brakes (11) that holds the trailer firmly in place.

What is claimed is:

1. A safety parking brake lever comprising an emergency brake lever with an 1/8" flat stock metal bar with 90 degree angle welded to the emergency brake lever creating a lock out bar to prevent a coupler release latch from being disengaged thus preventing a travel trailer from being detached from a vehicle without first engaging the safety parking brake lever.

2. A three hole mounting plate with three 5/16" thick Grade 8 bolt threads 9/16" in height welded to the mounting plate used to bolt a safety parking brake lever to a trailer tongue jack and is positioned between the trailer tongue jack and a top of a trailer frame.

3. An index plunger pin that is welded in line a ratcheting mechanism of a safety parking brake lever, so that when the safety parking brake lever is engaged by pulling the safety parking brake lever up, the safety parking brake lever causes the index plunger pin to insert behind the ratcheting mechanism in the safety parking brake lever and prevents the safety parking brake lever from accidentally being disengaged, and to disengage the safety parking brake lever, while a ring of the index plunger pin is pulled to free the ratcheting mechanism so that when a release button is pressed on the safety parking brake lever, the safety parking brake lever is allowed to lower and a lock out bar to cover a coupler release latch.

\* \* \* \* \*